(12) United States Patent
Turner

(10) Patent No.: US 9,258,387 B2
(45) Date of Patent: Feb. 9, 2016

(54) SYSTEM FOR SCAN ORGANIZING, MANAGING AND RUNNING ENTERPRISE-WIDE SCANS BY SELECTIVELY ENABLING AND DISABLING SCAN OBJECTS CREATED BY AGENTS

(71) Applicant: Raytheon Company, Waltham, MA (US)

(72) Inventor: Joseph A. Turner, Salt Lake City, UT (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/256,048

(22) Filed: Apr. 18, 2014

(65) Prior Publication Data

US 2014/0229522 A1  Aug. 14, 2014

Related U.S. Application Data

(62) Division of application No. 12/827,918, filed on Jun. 30, 2010, now Pat. No. 8,706,854.

(51) Int. Cl.

| G06F 3/048 | (2013.01) |
| G06F 7/00 | (2006.01) |
| G06F 11/00 | (2006.01) |
| G06F 15/16 | (2006.01) |
| G06F 15/173 | (2006.01) |
| H04L 29/06 | (2006.01) |
| G06F 17/30 | (2006.01) |
| G06F 21/56 | (2013.01) |

(52) U.S. Cl.
CPC ............ *H04L 67/42* (2013.01); *G06F 17/3089* (2013.01); *G06F 17/30867* (2013.01); *G06F 17/30964* (2013.01); *G06F 17/30973* (2013.01); *G06F 21/564* (2013.01)

(58) Field of Classification Search
CPC ............ G06F 17/3089; G06F 17/3067; G06F 17/30973; G06F 17/30964; G06F 21/564; H04L 67/42
USPC .......... 709/202, 223; 707/713, 718, 721, 758, 707/779, 755; 715/764; 726/22
See application file for complete search history.

(56) References Cited

U.S. PATENT DOCUMENTS

| 5,220,625 | A | * | 6/1993 | Hatakeyama et al. ......... 715/809 |
| 5,222,234 | A | * | 6/1993 | Wang et al. .................... 717/163 |
| 5,299,123 | A | * | 3/1994 | Wang et al. |
| 5,388,257 | A | * | 2/1995 | Bauer ........................... 707/741 |
| 5,428,735 | A | * | 6/1995 | Kahl et al. .................... 715/839 |
| 5,581,764 | A | * | 12/1996 | Fitzgerald et al. ............ 709/223 |
| 5,655,081 | A | | 8/1997 | Bonnell et al. |
| 6,266,659 | B1 | * | 7/2001 | Nadkarni ..................... 705/7.14 |

(Continued)

FOREIGN PATENT DOCUMENTS

WO    WO 2004100011 A1 * 11/2004 ............ G06F 15/173

*Primary Examiner* — Daniel C Murray
(74) *Attorney, Agent, or Firm* — Cantor Colburn LLP

(57) ABSTRACT

Disclosed is a system configured to create, organize, and monitor computer searches across a large number of networked computers. The system allows individual searches to be created and tailored depending upon specific objectives. Once established, the system permits the search parameters to be subsequently edited as needed. A graphical user interface (GUI) allows users to view established searches and to monitor searches once activated. Search results can also be tabulated by way of the GUI.

2 Claims, 13 Drawing Sheets

(56) References Cited

U.S. PATENT DOCUMENTS

| | | | |
|---|---|---|---|
| 6,275,810 B1* | 8/2001 | Hetherington et al. ...... 705/7.18 |
| 6,289,371 B1* | 9/2001 | Kumpf et al. ................. 709/203 |
| 6,292,889 B1* | 9/2001 | Fitzgerald et al. ................. 713/1 |
| 6,347,320 B1* | 2/2002 | Christensen et al. |
| 6,351,765 B1* | 2/2002 | Pietropaolo et al. .......... 709/218 |
| 6,366,907 B1* | 4/2002 | Fanning et al. |
| 6,460,070 B1* | 10/2002 | Turek et al. ................... 709/202 |
| 6,470,375 B1 | 10/2002 | Whitner et al. |
| 6,484,162 B1 | 11/2002 | Edlund et al. |
| 6,895,586 B1* | 5/2005 | Brasher et al. ................. 719/313 |
| 7,013,334 B2 | 3/2006 | Toyoshima et al. |
| 7,093,251 B2* | 8/2006 | Tsun .................... G06F 9/4843 709/224 |
| 7,181,623 B2* | 2/2007 | Golubchik ............ H04L 63/126 713/153 |
| 7,330,281 B2* | 2/2008 | Ferlitsch ............ H04N 1/00957 358/1.13 |
| 7,386,586 B1* | 6/2008 | Headley et al. ................ 709/202 |
| 7,464,149 B2* | 12/2008 | Choudhary et al. .......... 709/223 |
| 7,490,142 B2* | 2/2009 | Kumar et al. .................. 709/222 |
| 7,506,047 B2* | 3/2009 | Wiles, Jr. ....................... 709/224 |
| 7,552,139 B2* | 6/2009 | Smith et al. |
| 7,590,971 B2 | 9/2009 | Ferguson et al. |
| 7,600,007 B1* | 10/2009 | Lewis ............................ 709/223 |
| 7,650,401 B2* | 1/2010 | Choudhary et al. .......... 709/223 |
| 7,721,290 B2* | 5/2010 | Horikawa ............ G06F 9/4862 709/201 |
| 7,725,570 B1* | 5/2010 | Lewis ............................ 709/224 |
| 7,725,571 B1* | 5/2010 | Lewis ............................ 709/224 |
| 7,730,172 B1* | 6/2010 | Lewis ............................ 709/224 |
| 7,739,227 B2* | 6/2010 | Jordan et al. .................. 707/600 |
| 7,761,568 B1* | 7/2010 | Levi ........................ H04W 4/02 709/217 |
| 7,814,190 B2* | 10/2010 | Kacin et al. ................... 709/223 |
| 7,818,427 B2* | 10/2010 | Kacin et al. ................... 709/226 |
| 7,899,892 B2* | 3/2011 | Tremblay ................ H04L 67/16 709/220 |
| 7,904,536 B2 | 3/2011 | Greaves et al. |
| 8,028,066 B2* | 9/2011 | Lewis ............................ 709/224 |
| 8,073,721 B1* | 12/2011 | Lewis ............................ 705/7.12 |
| 8,099,400 B2* | 1/2012 | Haub et al. .................... 707/705 |
| 8,122,507 B1 | 2/2012 | Andruss et al. |
| 8,201,257 B1* | 6/2012 | Andres et al. .................... 726/25 |
| 8,219,572 B2* | 7/2012 | Ghosh et al. .................. 707/758 |
| 8,244,997 B2* | 8/2012 | Teranishi et al. .............. 711/162 |
| 8,326,921 B2* | 12/2012 | Naka .................... G06F 13/385 709/203 |
| 8,356,047 B2 | 1/2013 | Narayanan et al. |
| 8,386,464 B2 | 2/2013 | Haub et al. |
| 8,417,716 B2* | 4/2013 | Andersen et al. ............. 707/758 |
| 8,423,587 B2 | 4/2013 | Timmons |
| 8,996,482 B1* | 3/2015 | Singh ............ G06F 17/30575 707/698 |
| 2001/0042135 A1* | 11/2001 | Lewis ............................ 709/246 |
| 2001/0056482 A1* | 12/2001 | Lewis et al. ................... 709/224 |
| 2001/0056494 A1* | 12/2001 | Trabelsi ........................ 709/229 |
| 2002/0029263 A1 | 3/2002 | Toyoshima et al. |
| 2002/0032865 A1* | 3/2002 | Golubchik ............ H04L 63/126 713/178 |
| 2002/0049810 A1* | 4/2002 | Fitzgerald et al. ............ 709/203 |
| 2002/0052880 A1* | 5/2002 | Fruensgaard et al. ...... 707/104.1 |
| 2002/0083039 A1* | 6/2002 | Ferrari et al. ....................... 707/1 |
| 2002/0087887 A1* | 7/2002 | Busam et al. .................. 713/201 |
| 2002/0091815 A1* | 7/2002 | Anderson et al. ............. 709/223 |
| 2002/0091824 A1* | 7/2002 | Anderson et al. ............. 709/225 |
| 2002/0091944 A1* | 7/2002 | Anderson et al. ............. 713/201 |
| 2002/0116391 A1* | 8/2002 | Nadkarni ................... 707/104.1 |
| 2002/0165925 A1* | 11/2002 | Hamilton et al. ............. 709/213 |
| 2003/0023712 A1 | 1/2003 | Zhao et al. |
| 2003/0088633 A1* | 5/2003 | Chiu et al. .................... 709/206 |
| 2003/0105765 A1* | 6/2003 | Smith et al. ................... 707/100 |
| 2003/0208472 A1* | 11/2003 | Pham .................................. 707/2 |
| 2003/0225883 A1 | 12/2003 | Greaves et al. |
| 2004/0019672 A1* | 1/2004 | Das et al. ...................... 709/223 |
| 2004/0054690 A1* | 3/2004 | Hillerbrand et al. ....... 707/104.1 |
| 2004/0090458 A1* | 5/2004 | Yu et al. ........................ 345/760 |
| 2004/0193918 A1* | 9/2004 | Green et al. ................... 713/201 |
| 2004/0215751 A1* | 10/2004 | Kumar et al. ................. 709/222 |
| 2004/0249832 A1* | 12/2004 | Goldthorpe .................... 707/100 |
| 2005/0052664 A1* | 3/2005 | Ferlitsch ............ H04N 1/00957 358/1.6 |
| 2005/0080804 A1* | 4/2005 | Bradshaw et al. ............. 707/102 |
| 2005/0256883 A1 | 11/2005 | Greaves et al. |
| 2006/0015613 A1 | 1/2006 | Greaves et al. |
| 2006/0036565 A1* | 2/2006 | Bruecken .......................... 707/1 |
| 2006/0037079 A1 | 2/2006 | Midgley |
| 2006/0059142 A1* | 3/2006 | Zvinyatskovsky et al. ....... 707/5 |
| 2006/0069671 A1* | 3/2006 | Conley et al. ..................... 707/3 |
| 2006/0085852 A1* | 4/2006 | Sima ..................... G06F 21/552 726/22 |
| 2007/0061586 A1* | 3/2007 | Golubchik ............ H04L 63/126 713/178 |
| 2007/0250492 A1* | 10/2007 | Angel et al. ....................... 707/4 |
| 2008/0034002 A1* | 2/2008 | Nadkarni ................... 707/104.1 |
| 2008/0104045 A1* | 5/2008 | Cohen et al. ...................... 707/4 |
| 2008/0140621 A1* | 6/2008 | Martinez et al. ................... 707/3 |
| 2008/0263009 A1 | 10/2008 | Buettner et al. |
| 2008/0270592 A1* | 10/2008 | Choudhary et al. .......... 709/223 |
| 2008/0313231 A1 | 12/2008 | Kloba |
| 2009/0113151 A1* | 4/2009 | Teranishi et al. .............. 711/162 |
| 2009/0157610 A1* | 6/2009 | Allen et al. ........................ 707/3 |
| 2009/0204577 A1 | 8/2009 | Mayer-Ullmann et al. |
| 2009/0240765 A1* | 9/2009 | Wiles, Jr. ...................... 709/203 |
| 2010/0057702 A1* | 3/2010 | Ghosh et al. ...................... 707/4 |
| 2010/0218104 A1* | 8/2010 | Lewis ............................ 715/736 |
| 2010/0250664 A1* | 9/2010 | Naka ..................... G06F 13/385 709/203 |
| 2011/0010366 A1* | 1/2011 | Varshavsky et al. .......... 707/732 |
| 2011/0022583 A1* | 1/2011 | Pennell et al. ................. 707/718 |
| 2011/0022609 A1* | 1/2011 | Grover ........................... 707/755 |
| 2011/0197280 A1* | 8/2011 | Young et al. ..................... 726/24 |
| 2011/0213764 A1* | 9/2011 | Stone et al. .................... 707/709 |
| 2012/0041858 A1* | 2/2012 | Lewis .............................. 705/34 |
| 2012/0059817 A1* | 3/2012 | Burger et al. .................. 707/718 |
| 2012/0078869 A1* | 3/2012 | Bellville et al. ............... 707/706 |
| 2012/0197928 A1* | 8/2012 | Zhang et al. ................... 707/769 |
| 2013/0103682 A1* | 4/2013 | Ghosh et al. ................... 707/731 |
| 2015/0172140 A1* | 6/2015 | Habdank ................. H04L 43/00 709/224 |
| 2015/0195229 A1* | 7/2015 | Schaefer .................. H04L 67/06 709/206 |

* cited by examiner

| Label ▲ | Type |
|---|---|
| Block Mount | Block Mount |
| Collect Clipboard 2-Minute Response | Collect |
| Collect Email 2-Minute Response | Collect |
| Collect File 2-Minute Response | Collect |
| Collect File Discovery Response | Collect |
| Collect Generic App 2-Minute Response | Collect |
| Collect IM 2-Minute Response | Collect |
| Collect Keyboard 2-Minute Response | Collect |
| Collect Login No Video 2-Minute Response | Collect |
| Collect Lotus Notes 2-Minute Response | Collect |
| Collect Printer 2-Minute Response | Collect |
| Collect Printer No Video 2-Minute Response | Collect |
| Collect Process 2-Minute Response | Collect |
| Collect Registry Monitor Response | Collect |
| Collect System Info 2-Minute Response | Collect |
| Collect Web 2-Minute Response | Collect |
| Collect web URL Response | Collect |
| Disconnect | Disconnect |
| Prevent Web Collections Response | Prevent Collection |
| Report | Report |
| Shutdown | Shutdown |
| Stop Process | Stop Process |
| User Lockout | User Lockout |
| User Prompting Response | User Prompt |

FIG.10A

| Description |
|---|
| Block the mounting of a device |
| This trigger response will collect 2 minutes of pre and post clipboard data and video. |
| This trigger response will collect 2 minutes of pre and post email data and video. |
| This trigger response will collect 2 minutes of pre and post file data and video. |
| This trigger response will collect file discovery data. |
| This trigger response will collect 2 minutes of pre and post of generic application data and video. |
| This trigger response will collect 2 minutes of pre and post IM data and video. |
| This trigger response will collect 2 minutes of pre and post keyboard data and video. |
| This trigger response will collect 2 minutes of pre and post login data. This response contains no video collections. |
| This trigger response will collect 2 minutes of pre and post lotus notes data and video. |
| This trigger response will collect 2 minutes of pre and post printer data and video. |
| This trigger response will collect 2 minutes of pre and post printer data. This response contains no video collections. |
| This trigger response will collect 2 minutes of pre and post process data and video. |
| This trigger response will collect 2 minutes of pre and post registry data and video. |
| This trigger response will collect 2 minutes of pre and post system information data and video. |
| This trigger response will collect 2 minutes of pre and post web data and video. |
| This trigger response will collect the URL that caused the trigger to fire. This response will not collect video. |
| Disconnect the user from the network |
| This trigger response will prevent web collections. |
| Report |
| Shutdown the system |
| Stop the process that generated the trigger |
| Lock out the User |
| This trigger response will display a user prompt message asking the user to explain their actions that caused the trigger to fire. |

FIG.10B

SYSTEM FOR SCAN ORGANIZING, MANAGING AND RUNNING ENTERPRISE-WIDE SCANS BY SELECTIVELY ENABLING AND DISABLING SCAN OBJECTS CREATED BY AGENTS

CROSS-REFERENCE TO RELATED APPLICATION

This application is a division of U.S. patent application Ser. No. 12/827,918, filed Jun. 30, 2010, the disclosure of which is incorporated by reference herein in its entirety.

TECHNICAL FIELD

This disclosure relates to a system for scanning multiple computers within a network. More specifically, the disclosure relates to a system and method for creating, modifying and monitoring enterprise-wide scans.

BACKGROUND OF THE INVENTION

The storage capacity of computers has increased to the point that general-purpose personal computers can now hold terabytes of digital data. Computer servers can hold considerably more. With such large storage capacities comes an increasing demand to effectively search this information. In recent years there has been an increased emphasis on effectively scanning computer hard drives. These scans are performed to locate relevant data as well as to manage system properties.

A wide variety of scans have now become common place. For example, Boolean-type key word searching can be used to examine the contents of a file and return contextually relevant files. Other searches can be carried out to locate specific file types and/or file names. These searches can be carried out over an entire hard drive or they can be limited to specific file paths. Searches of a computer registry can be preformed to detect hardware changes and/or updated software configurations. It is also now common place to perform scans to locate computer viruses or malware. These searches typically search a drive for signatures indicative of malware. All of the foregoing examples can be conducted one time, or they can be repeatedly preformed at specific times or after specific time intervals.

Complicating matters is the fact that the searches discussed above must be run on individual computers or workstations. This quickly becomes a cumbersome task when dealing with a large network having numerous computers. As a result, IT professionals within an organization spend large amounts of time running the same searches on separate workstations. Moreover, there is currently no means of ensuring that such searching is done in a uniform manner across all the computers in a network. Nor is there a means for monitoring the progress and/or competition status of searches across a network. Keeping track of search results is similarly complicated for enterprise level networks.

Thus, there exists a need in the art to permit computer searches to be easily created and configured. There also exists a need in the art to permit a single computer to initiate and monitor searches across a number different computers distributed over a computer network. There further exists a need to tabulate search results for searches performed across a network. There is still yet an additional need to permit all of the foregoing to be accomplished via an intuitive graphical user interface (GUI). The system and method disclosed herein are aimed at fulfilling these as well as other needs.

SUMMARY

One of the advantages of the present system is the ability to control searches or scans across a large number of workstations.

It is another advantage of the present system to facilitate greater user control over the parameters of a scan by permitting users to specify a scan label, search type, and included and excluded file paths.

Still yet another advantage is the ability to monitor those scans that are currently in progress and those scans that are complete.

Another advantage is the ability to create a plurality of specifically tailored searches and to store such searches in a database for future reference.

It is also an advantage of the present system to allow stored searches to be selectively recalled, edited, activated, deactivated or deleted.

These and other advantages are provided by a system and method wherein a single computer can initiate searches across multiple workstation computers within a network. The search can be configured and/or modified by a user via a graphical user interface (GUI). The GUI permits the user to, inter alia, monitor the progress of searches and view search results.

Various embodiments of the invention may have none, some, or all of these advantages. Other technical advantages will be readily apparent to one skilled in the art.

BRIEF DESCRIPTION OF THE SEVERAL VIEWS OF THE DRAWINGS

For a more complete understanding of the present disclosure and its advantages, references is now made to the following detailed description and the accompanying drawings, of which:

FIGS. 10A and 10B are screen shots of the trigger actions feature of the present disclosure.

Similar reference numerals refer to common elements throughout the several figures of the drawings.

DETAILED DESCRIPTION

Disclosed is a system and method for creating, organizing, and monitoring computer searches across a large number of networked computers. The system allows individual searches to be created and tailored depending upon specific objectives. Once established, the system permits the search parameters to be subsequently edited as needed. A graphical user interface (GUI) allows users to view established searches and to monitor searches once activated. Search results can also be tabulated by way of the GUI. The details of the present disclosure are described in greater detail hereinafter.

Figure 1:
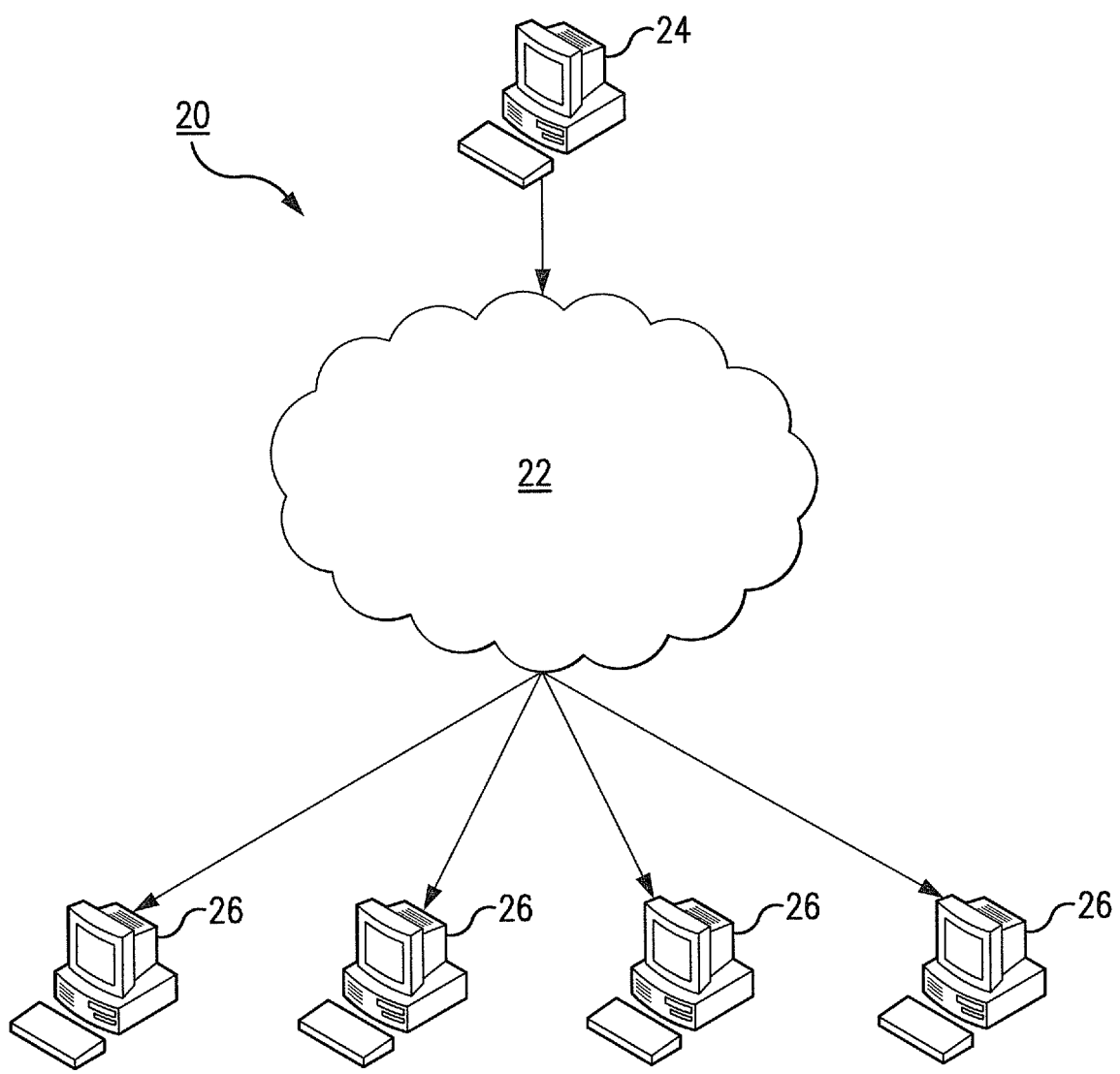
FIG. 1 is a diagram illustrating a computer network utilized by the system of the present disclosure.

The disclosed system 20 is designed to be employed over a computer network, such as the network 22 illustrated in FIG. 1. As illustrated in FIG. 1, a central computer 24, which may be a server or a cluster of computers, communicates with a number of client computers 26 via network 22. Although FIG. 1 illustrates four client computers 26, it is understood that any number of client computers 26 can be employed depending upon the nature of the network. The central and client computers (24 and 26) can be, for example, servers, computer clusters, server pools, general-purpose personal computers, workstations, laptops, net books, personal digital assistants (PDAs), or cellular telephones. The term "computer" as used herein encompasses all of these various computing devices.

Network 22 facilitates wireless or wireline communication between the central computer 24 and the various client computers 26. More specifically, central computer 24 directs software agents resident on client computers 26 to carry out various computer searches or scans. Although network 22 is illustrated as residing between central computer 24 and client computers 26, it may also reside between various interconnected nodes without departing from the scope of the disclosure. Network further includes plural networks, and/or sub-network(s), operable to facilitate communications between various computing components.

Communications over network 22 can be carried out via any number of known protocols, including, but not limited to, Internet Protocol (IP), Wireless Access Protocol (WAP), Frame Relay, or Asynchronous Transfer Mode (ATM). However, the IP communications protocol is preferred. Any other suitable protocols using voice, video, data, or combinations thereof, can also be employed. Network 22 may include one or more local area networks (LANs), radio access networks (RANs), metropolitan area networks (MANs), wide area networks (WANs), and/or all or a portion of the global computer network known as the Internet, and/or any other communication system or systems at one or more locations.

In accordance with the disclosure, computer searches can be created, edited, enabled, and disabled via a software application resident on central computer 24. The user oversees and directs these processes via the GUI associated with the software application. The GUI further allows the user to review the results of the search and to monitor completion status. The software application described herein can be written in any of a variety of standard programming languages, such as C, C++ or Java.

Figure 2:
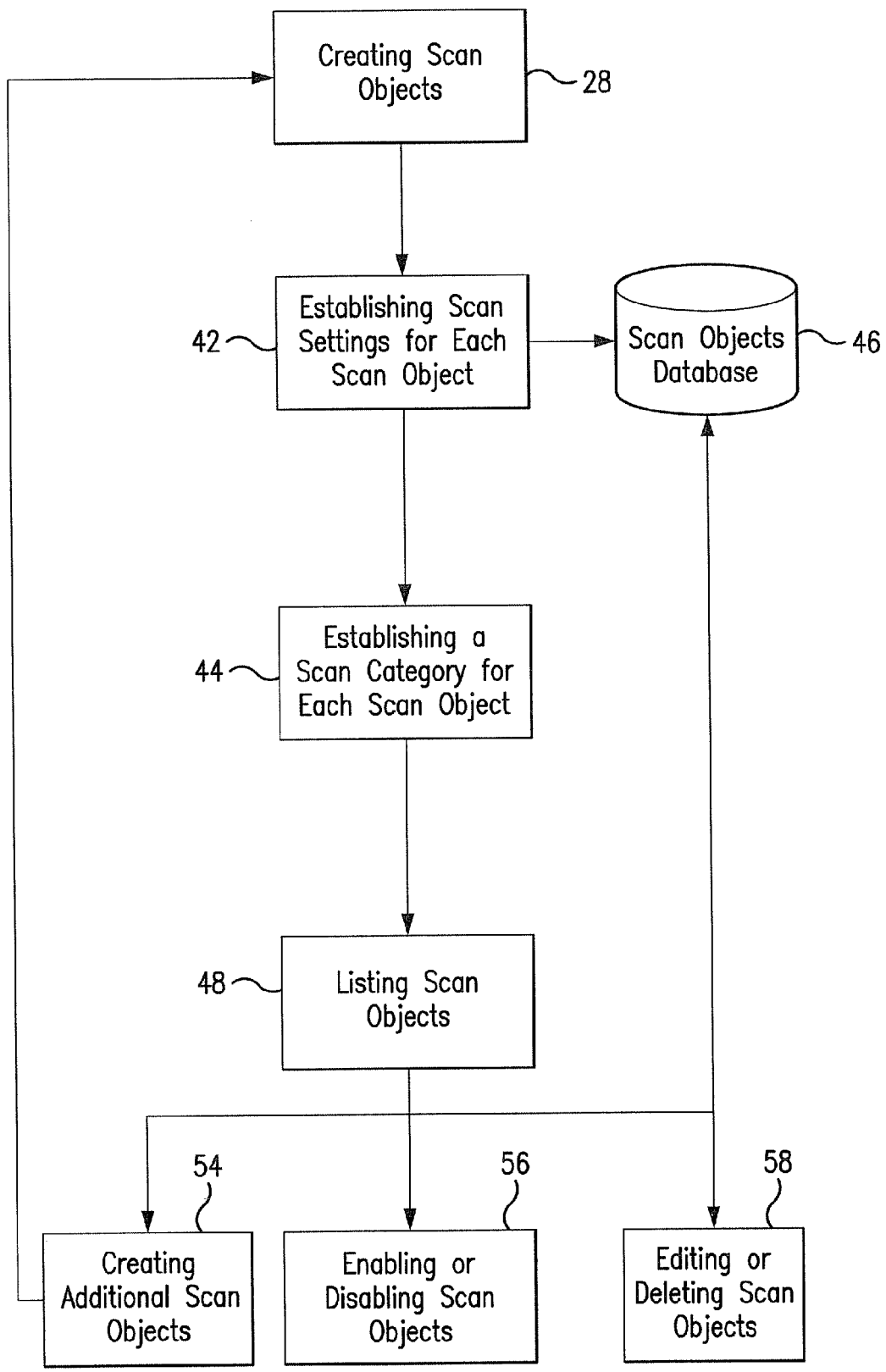
FIG. 2 is a block diagram illustrating how scan objects are created and managed in accordance with the present disclosure.

FIG. 2 is a flow chart demonstrating the steps carried out in establishing the parameters for a new search. As used herein, a "scan object" refers to a data file or directory containing all of the parameters associated with a search or scan. The user is taken through the process of creating a scan object by way of the GUI and a scan wizard application. Different scan objects can be created for, and carried out by, different software agents 62 resident on computers 26 within network 22. Screen shots of some of the steps associated with the scan wizard application are illustrated in FIGS. 3-9.

Figure 3:
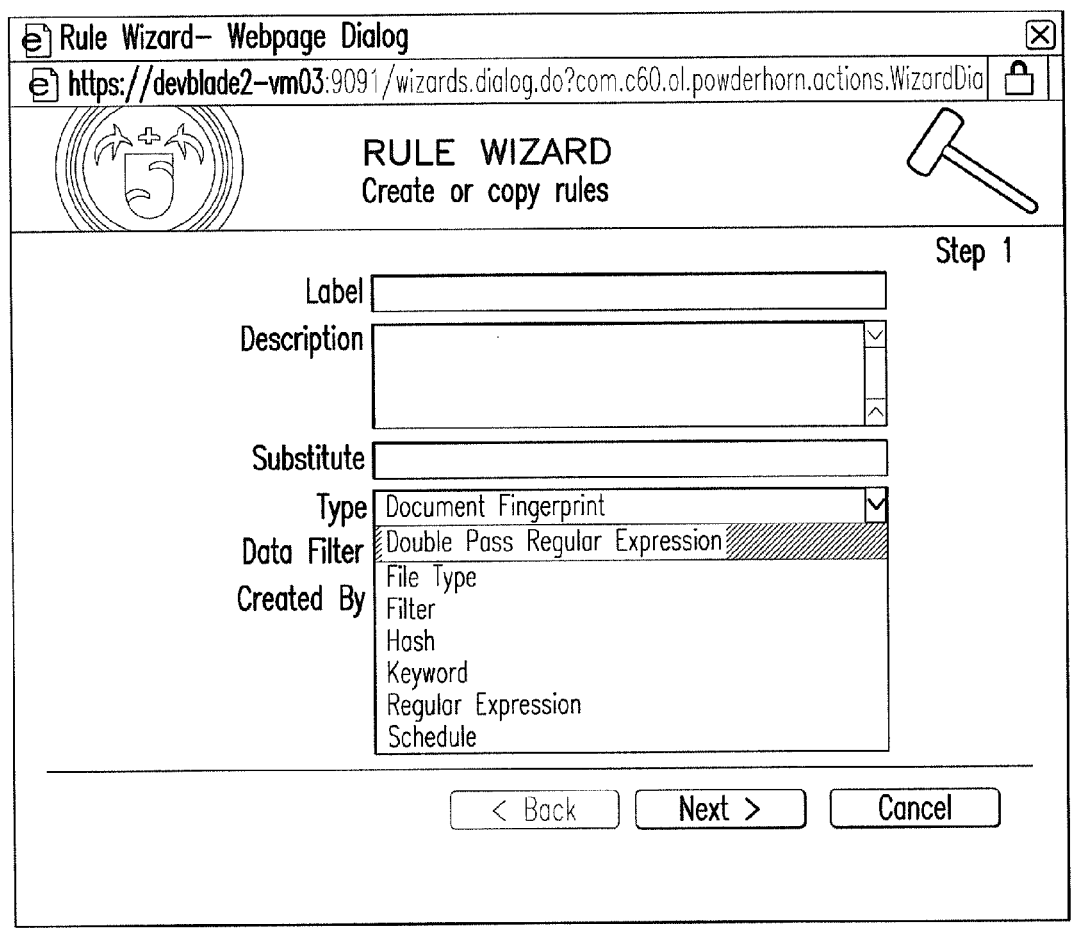
FIGS. 3-9 are sequential screen shots of the scan wizard feature of the present disclosure.
Figure 4:
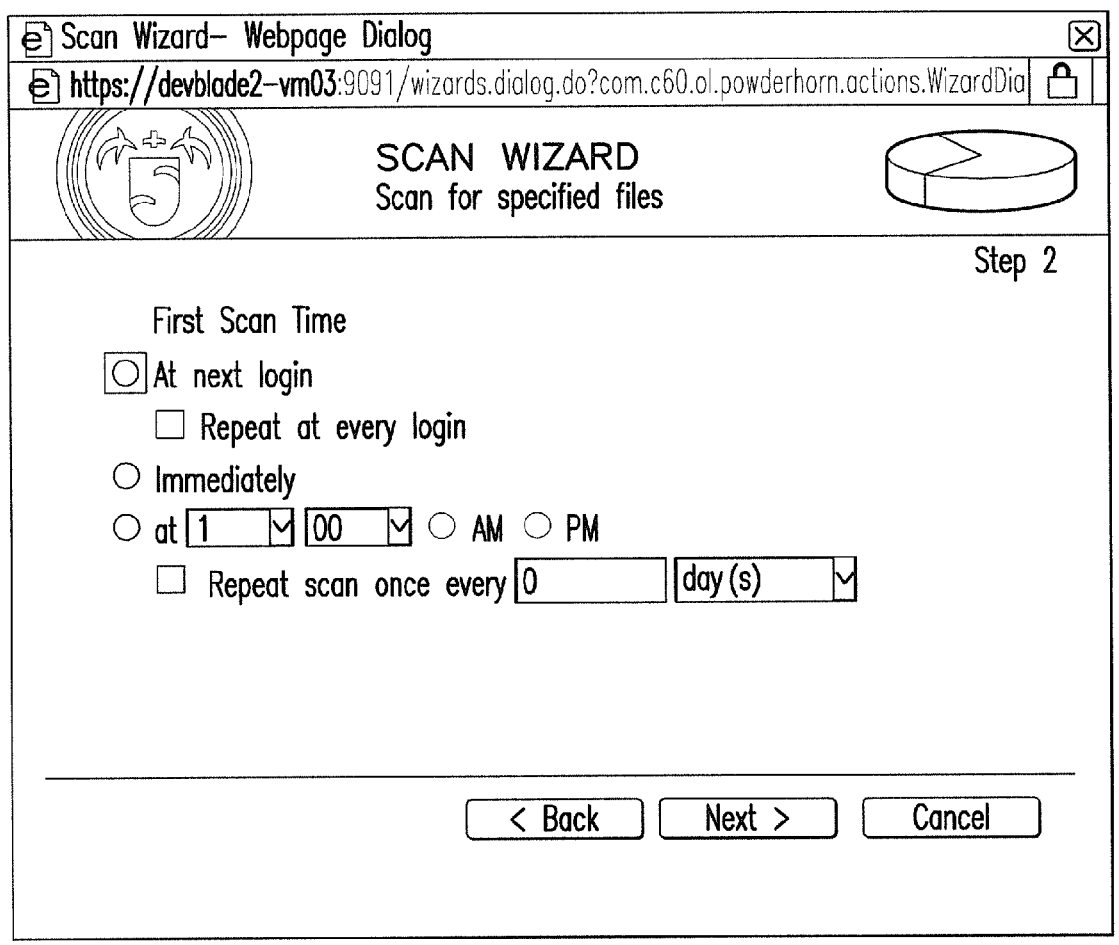

The first step 28 in the process of creating a scan object is depicted in FIG. 2. In this initial step, a description and a label (or name) for the scan object are provided by the user. These identifiers permit the user to identify and recall the scan object at a later time. A substitute label can likewise be created for use by the agents in lieu of the primary identifier. Also in the first step 28 the user can use a pull down menu to select the desired scan type. FIG. 3 is a screen shot of the Scan Wizard that is employed in carrying out this first step 28. A variety of scan types can be selected in step 28. Potential scan types include: keyword for searching for specific words or phrases; file type for searching for specific file types or extensions; file scans for searching for complete files; and registry scans for searching within specific file directories. Still yet other scan types can be specified, such as regular expression, filter, hash, or double pass regular expression. If a keyword search is selected, logic operators, such as Boolean expressions, can be utilized. In such cases, the user is subsequently prompted to provide the search terms and the logic operators. The user is likewise prompted to provide other terms to be searched depending upon the search type selected. A scan event is triggered only after the search terms have been located by the associated software agent resident on the client computer.

Next, the user establishes various settings for the scan object in the second step 42 of FIG. 2. The scan settings may include, for example, specifying when the search is to be carried out (note FIG. 4). For instance, the user may specify that the search is to be carried out at the next login and/or repeated at every login. The user can alternatively specify that the search is to be carried out immediately or at a specified time. The time intervals for repeating the search can also be specified. Searches can also be carried out in response to certain triggers. Triggers allow searches to be tailored to look for information associated with an event. For instance, if the search involves looking for online purchases, the triggering event could be locating credit card numbers (i.e. 15 or 16 digit sequences) associated with an upload or download from an Internet browser. FIGS. 10A and 10B are screen shots listing various triggering events.

Figure 5:
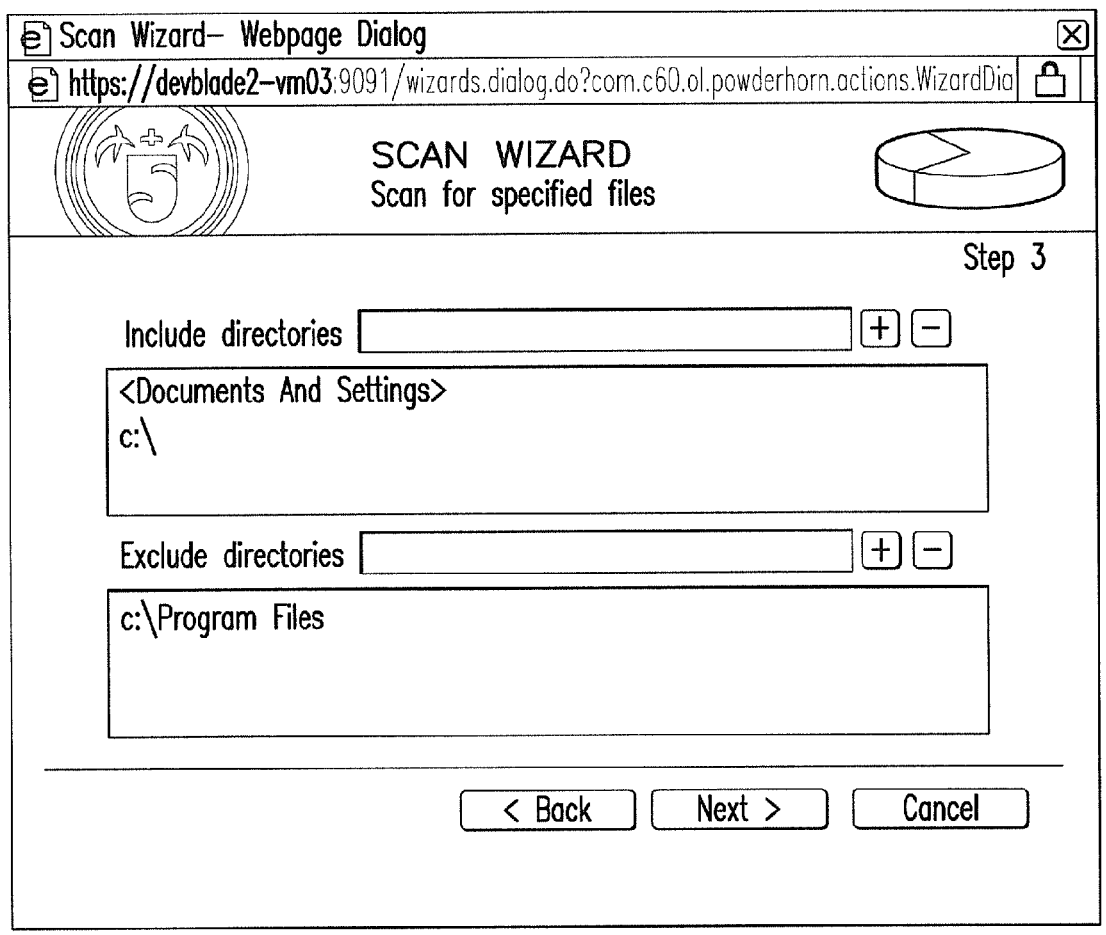
Figure 6:
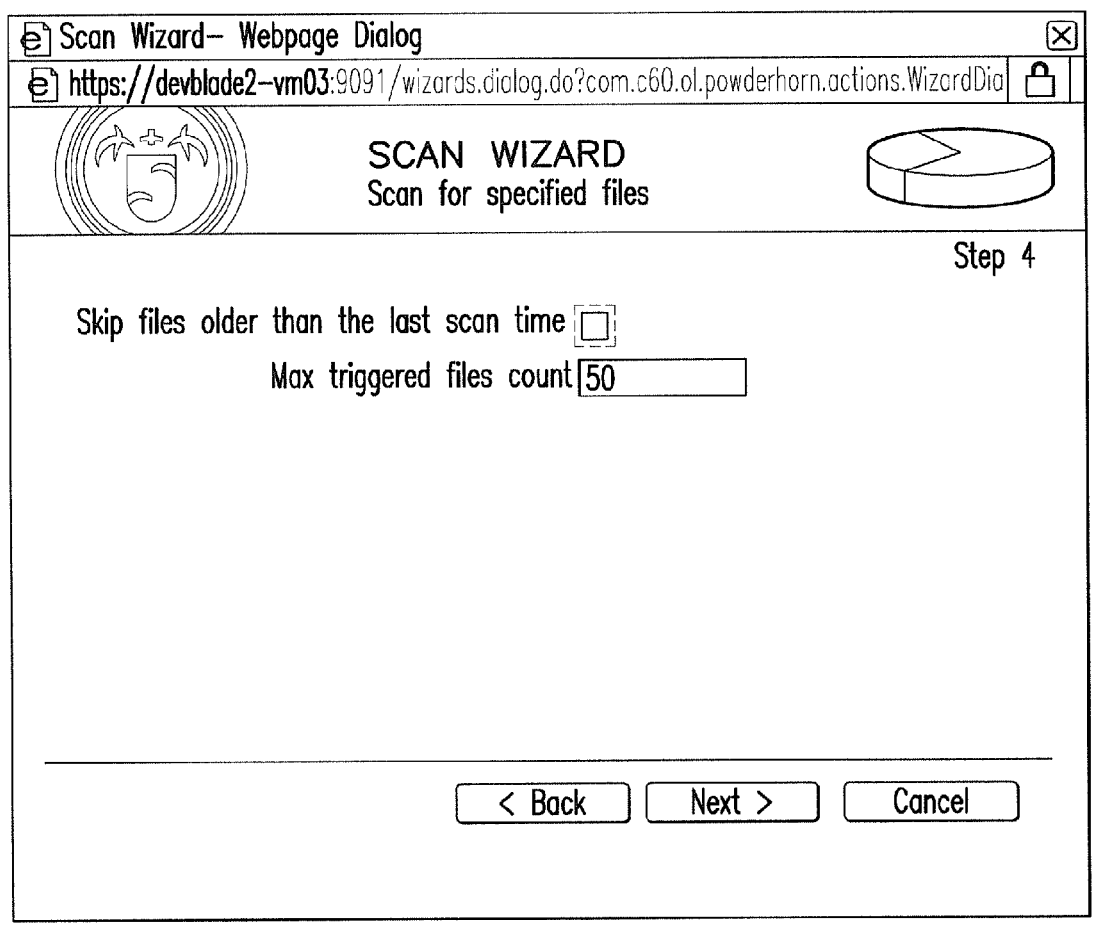
Figure 7:
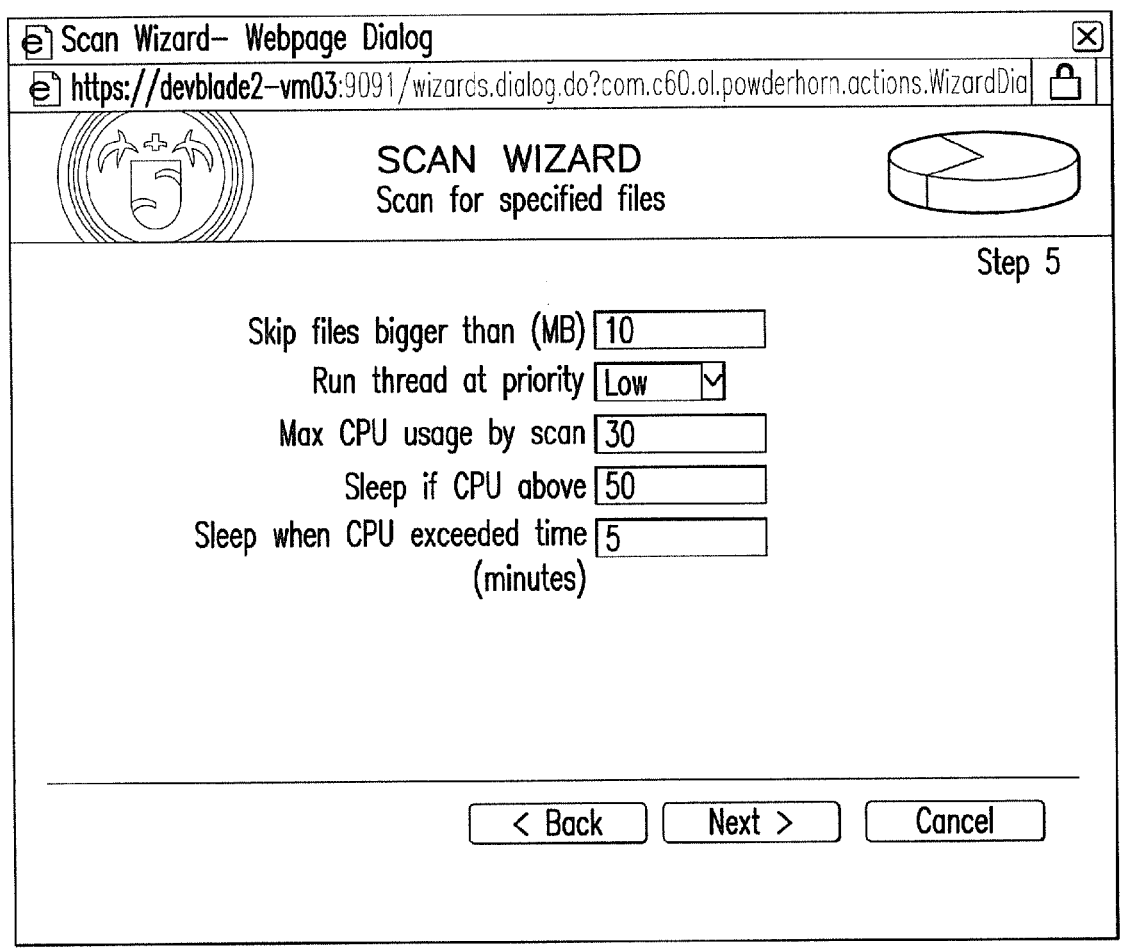
Figure 8:
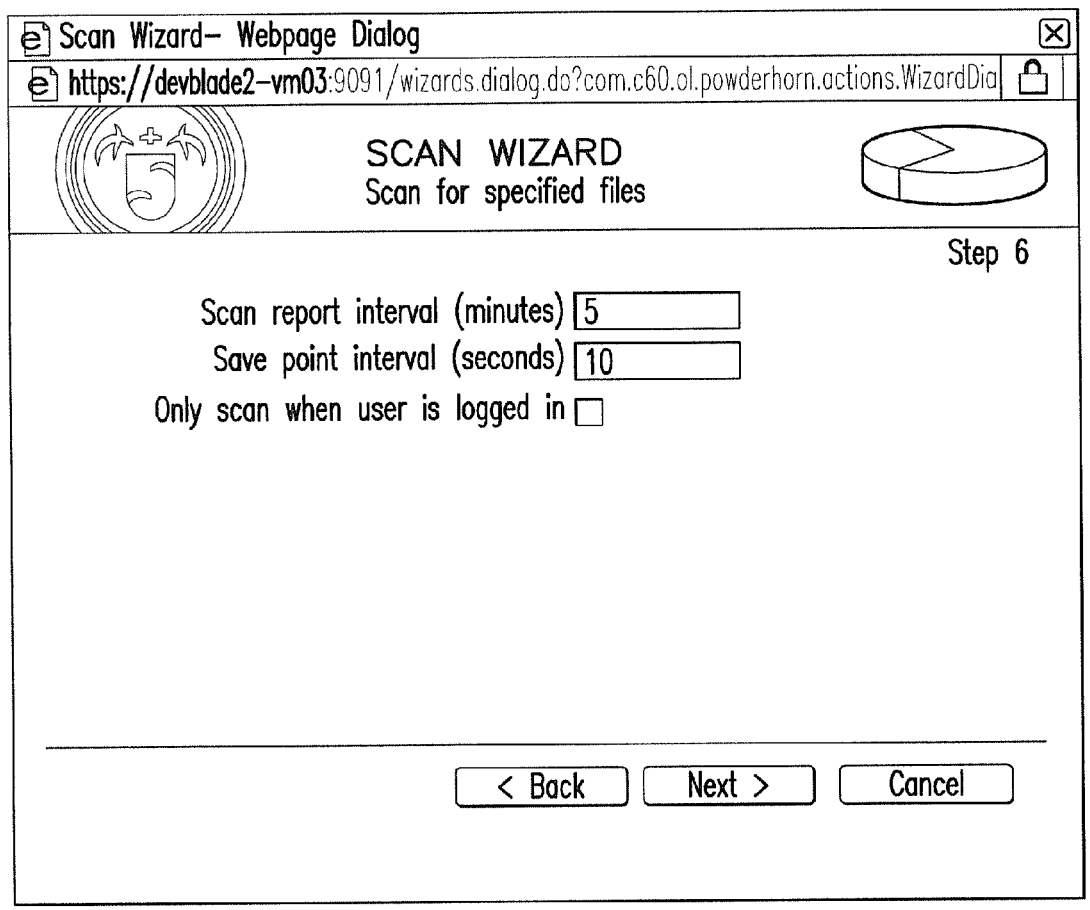

The settings selected in step 42 may further include specifying the file paths to be included or excluded from the search (note FIG. 5). The scan settings additionally include whether to skip previous searched files, as well as a setting to specify the maximum number of files to be returned (note FIG. 6). As noted by the screen shot of FIG. 7, still yet other settings include priority settings, such as file sizes to search, file sizes to be skipped, the maximum CPU usage to be used in the search, and the CPU usage to trigger a sleep mode. Other settings optionally include the intervals (in minutes) for providing a report to the central computer 24 and/or for saving the search results (note FIG. 8).

Figure 9:
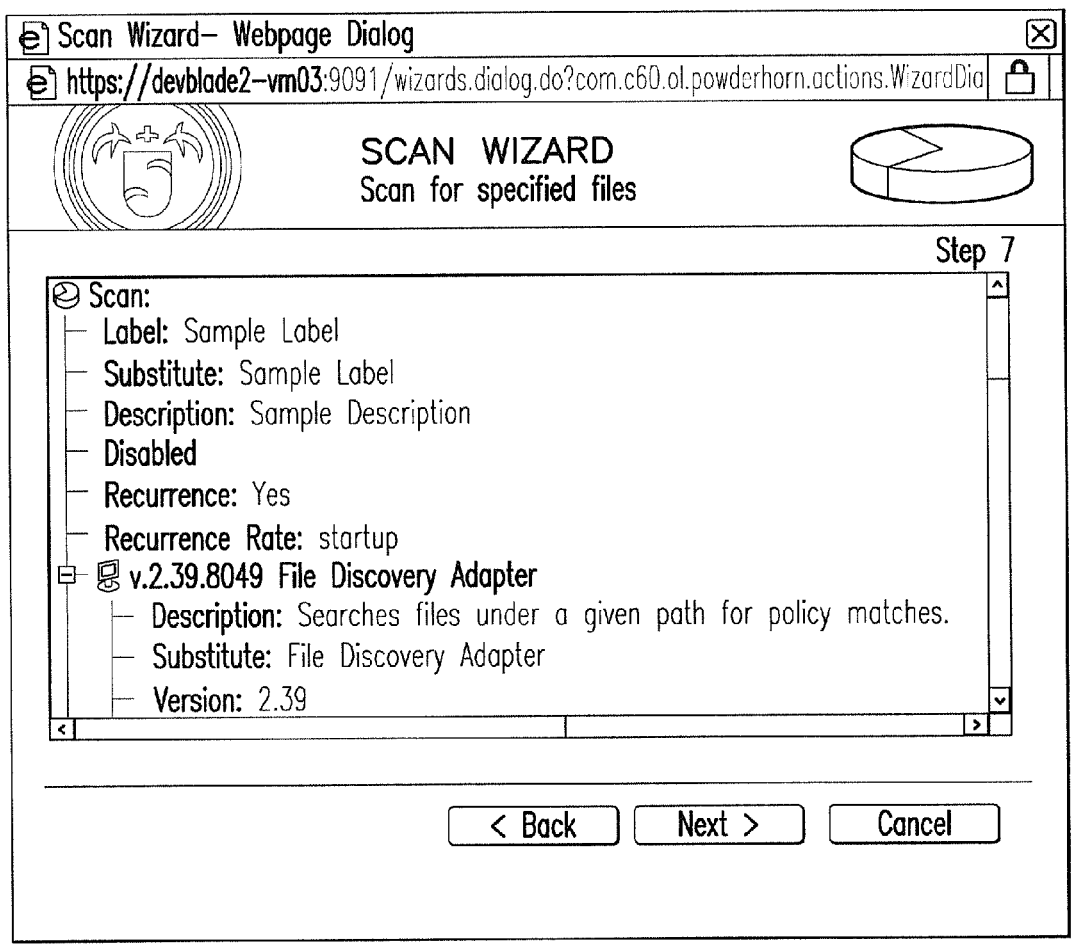

FIG. 9 illustrates a tree-type listing of all the various parameters associated with a scan object. Still yet other pages can be included in the scan wizard as needed. Following the selection of these settings, the completed scan object is stored in a scan objects database 46 for future reference (note FIG. 2).

In the following step 44, a scan category is associated with each scan object. A scan category is the title or heading for a specific pre-defined scan object. Scan categories include, inter alia, the label, description, and filters established in step 28 and all the associated settings established in step 42. Thus, a scan category represents all the data needed for an agent 62 to carry out a search. Search categories allow users to classify and save pre-defined searches for recall later as needed. In accordance with the invention, different categories can be assigned to different client computers 26. This permits entirely different searches to be carried out by different agents 62 across the network 22. In one embodiment, a number of pre-defined categories can be stored and presented to the user via a drop down menu. The categories displayed to the user in the drop down menu will depend upon selections made in steps 28 and 42.

Figure 11:
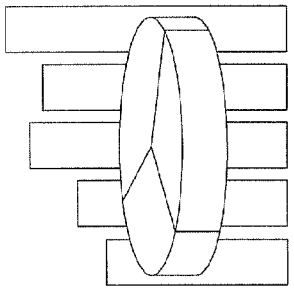
FIG. 11 is a screen shot of the scan list feature of the present disclosure.

All of the scan objects stored in the scan objects database 46 can thereafter be presented in a listing via the GUI at step 48. FIG. 11 depicts a scan list page which represents one possible representation of the listing. Text within the scan list page can include hypertext links to other pages with more detailed information. The first column in the scan list page includes a check box that can be toggled on or off depending upon whether the corresponding scan object is to be interacted with. By toggling several scan objects "on," the user can interact with several scan objects at the same time.

The second column shows the enabled or disabled status of the scan object. The enabled or disabled status can be toggled on or off by the user. When enabled, the search will be run by the software agents on client computers 26 at the specified time(s). Disabled search objects will not be run by the agents. The third column identifies the scan label as chosen by the user to identify the scan object.

The fourth column identifies the search category associated with the scan object. This field may be truncated if numerous search terms are to be employed. The fifth column indicates whether the scan object is recurrent. As "yes" in this field signifies that the search object is to be run repeatedly at specified intervals. The sixth column specifies how many events have been recorded by the scan object over its history. As noted above, an event is triggered anytime a search agent locates a specified term or expression. The seventh column reflects that number of agents that have a scan object assigned but which have not reported back to the central computer. The eighth column shows the number of agents that are currently in the process of running the identified scan. The ninth column shows the number of agents that have successfully completed the scan. The tenth column shows the number of agents that have reported an error during the scan.

As noted in FIG. 2, the user can initiate the scan creation wizard at step 54 and enable or disabled previously created scan objects at step 56. In the event that more than one scan object is assigned to a given agent, the scans can be run sequentially. The user can be prompted to provide details on the desired sequencing of the scans. Specific reports can also be run from the scan list page. One possible report is the scan completion report. This report lists the events from the scan object within a specified date range. A scan completion report can also be run. This report lists the number of agents in each scan state (running, complete, not started, error). It can also provide a list of agents in each of the respective scan states.

The software application represented by FIG. 2 may also include a scan object editor for modifying scan objects after they have been created. This permits the user to edit an existing scan object at step 58 by, for example, changing the search type or category or by otherwise changing the timing or time intervals associated with the object. Once changes are made the scan objects database 46 is updated accordingly. The scan object editor can be pre-populated from information from the scan list page (note FIG. 11) in order to minimize the manual input of data.

Figure 12:
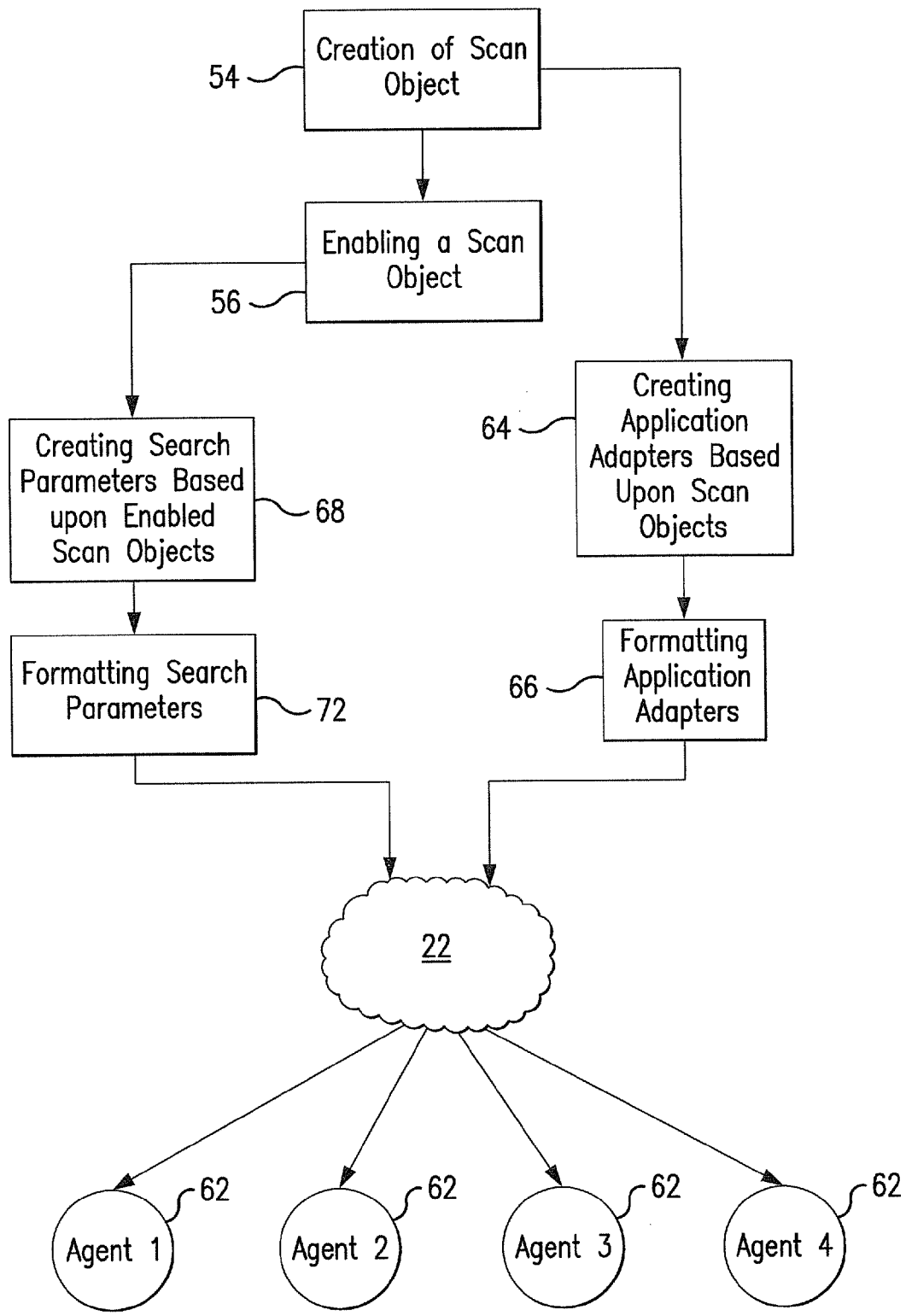
FIG. 12 is a block diagram illustrating how search parameters and application adapters are created and distributed over the network to a number of software agents.

The interaction between the software application of central computer 24 and the agents 62 of the client computers 26 is illustrated in FIG. 12. Communication with the software agents 62 is established both after the creation of a scan object (step 54) and after the scan object is enabled (step 56). After a scan object is completed, but prior to its activation, an application adapter is created at step 64 and is communicated to the various software agents 62 via network 22. These application adapters 64 are extensions, or plug-ins, to the software agents 62 and enable agents 62 to complete the scans specified by the scan objects. Application adapters 64 may include, for example, a listing of the correct scan sections to be searched by a client 62. Prior to the application adapters 64 being sent down, they are formatted at step 66 by way of an agent server protocol in a process referred to as baking. The formatted application adapters are then sent to agents 62 on the client computers 26. Application adapters 64 must be re-baked when an adapter is added or modified or when a scan object is added, modified or deleted. Application adapters must likewise be re-baked when scan categories are modified.

Additionally, once a scan object is activated by the user, all of the parameters associated with the search are sent down to the software agents at step 68. The parameters include the scan type, category, and settings as well as any other information required in order for agents to carry out the specified scan. These parameters are also baked at step 72 prior to being sent to agents 62 over the network 22. Agents 62 may be programmed to contact central computer 24 to verify the search parameters prior to undertaking a search. This request is sent up on an agent's heartbeat signal. This heartbeat signal is always sent even in instances where there are no search parameters to send. Agent 62 may likewise request updated application adapters if necessary to perform the requested search.

The system and method can be used to carry out a number of different searches, including, but not limited to, the following examples.

EXAMPLE ONE

A one-time scan to look for certain file names by keyword or regular expression (regex) on a set of workstations. The search may scan for one or two important file names. Events from this kind of scan are reported on the scan list page (note FIGS. 10A and 10B). Locating events may result in an investigation into a particular user.

EXAMPLE TWO

Anti-malware scans across an enterprise. These are very narrow, focused scans looking for evidence of malware intrusion into the networked computers. Malware signatures can be updated to the categories for registry and file scans. Events from this scan can result in the quarantine and repair of the infected workstations.

EXAMPLE THREE

Daily searches for classified material on an unclassified network. For instance, every weeknight at 1am a scan can be run that looks inside documents for classification headers on all clients on the unclassified network. The search can be limited to files that have changed since the last scan to minimize search time.

EXAMPLE FOUR

Periodic compliance scans to determine how clean worker workstations are. Compliance scans may look for a variety of things: presence of any social security numbers or certain unauthorized hardware that has been installed (like CD burners or peer-to-peer software).

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A system for managing multiple scans across a computer network, the system comprising:
    a central computer configured to organize and manage a plurality of different scans across a number of different computer workstations in a computer network;
    a number of client computers, the client computers communicating with the central computer via the computer network, each of the client computers including one or more agents configured to create a series of scan objects that are selectively enabled and disabled to perform a scan of the client computer, each scan object containing a scan name, description, and a type of scan to be performed, and each scan object assigned a scan setting including file paths to be searched, scanning intervals and start times;
    the client computers including an agent server protocol that formats search details specified by the scan object prior to activating the scan object, the agent configured to determine at least one enabled scan object among the series of scan objects and the prior formatted searched details, and create search parameters based upon the at least one scan object in response to enabling the at least one scan object, the search parameters being formatted by way of the agent server protocol, and sending formatted search parameters to one or more agents via the computer network, whereby the agents carry out scans in accordance with the formatted search parameters;
    a database associated with the central computer, the database containing a plurality of different scan objects and the scan setting assigned to each scan object, each of the scan objects containing details regarding a type of scan to be performed; and
    a graphical user interface (GUI) configured to display a list of each scan object individually and communication commands to the central computer, whereby the GUI enables users to initiate a scan by an agent in accordance with the details specified by a corresponding scan object, the GUI configured to display scan activity by way of the GUI, the scan activity including a number of agents currently in the process of scanning, a number of agents that have successfully completed a scan, and a number of events recorded,
    wherein an application adapter is delivered to the agents prior to a search being initiated, and wherein the central computer formats the application adapter by way of the agent server protocol, the formatted application adapters interfacing with the agents and enabling the scans specified by the scan objects and sending the formatted application adapters to one or more agents via the computer network.

2. The system as described in claim 1 further comprising a scan object editor configured to permit a user to modify a previously created scan object.

\* \* \* \* \*